June 21, 1966  A. VAN DER LELY  3,257,115
IMPLEMENTS FOR SPREADING GRANULAR OR POWDERED MATERIAL
Filed Aug. 26, 1963  5 Sheets-Sheet 1

INVENTOR.
ARY VAN DER LELY
BY
Mason, Mason & Albright
Attorneys

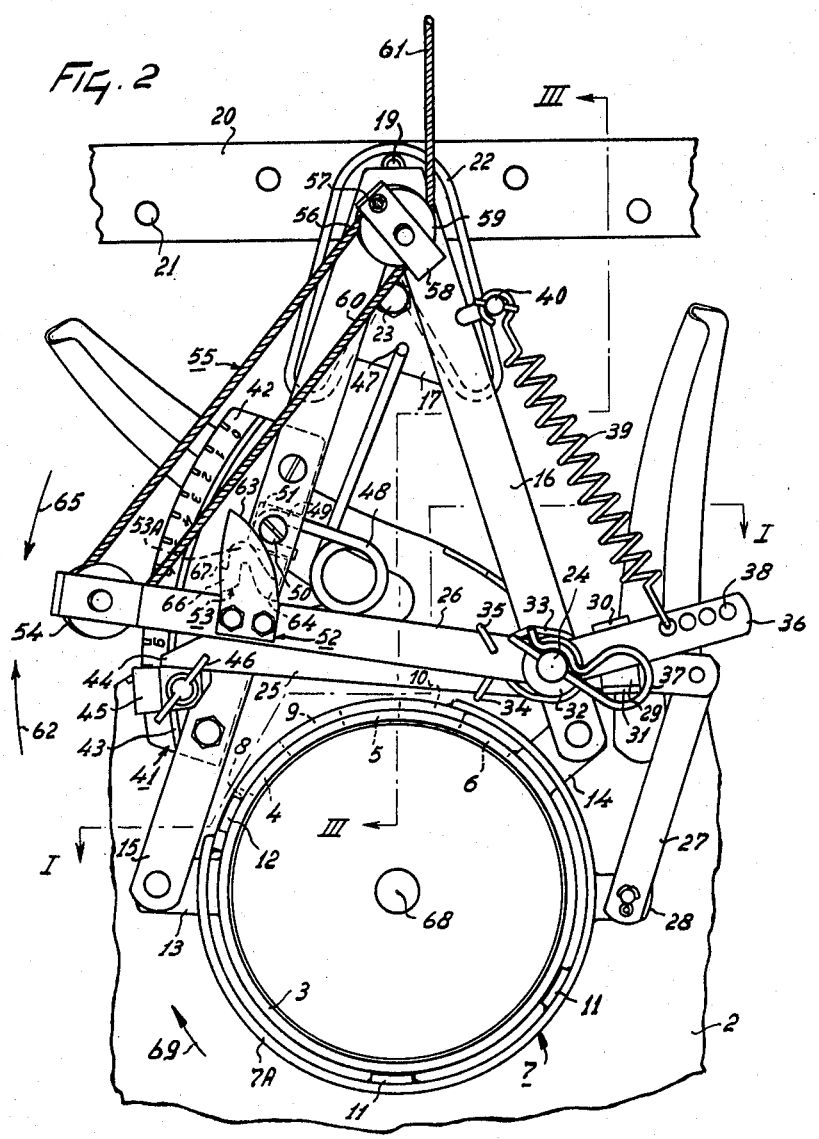

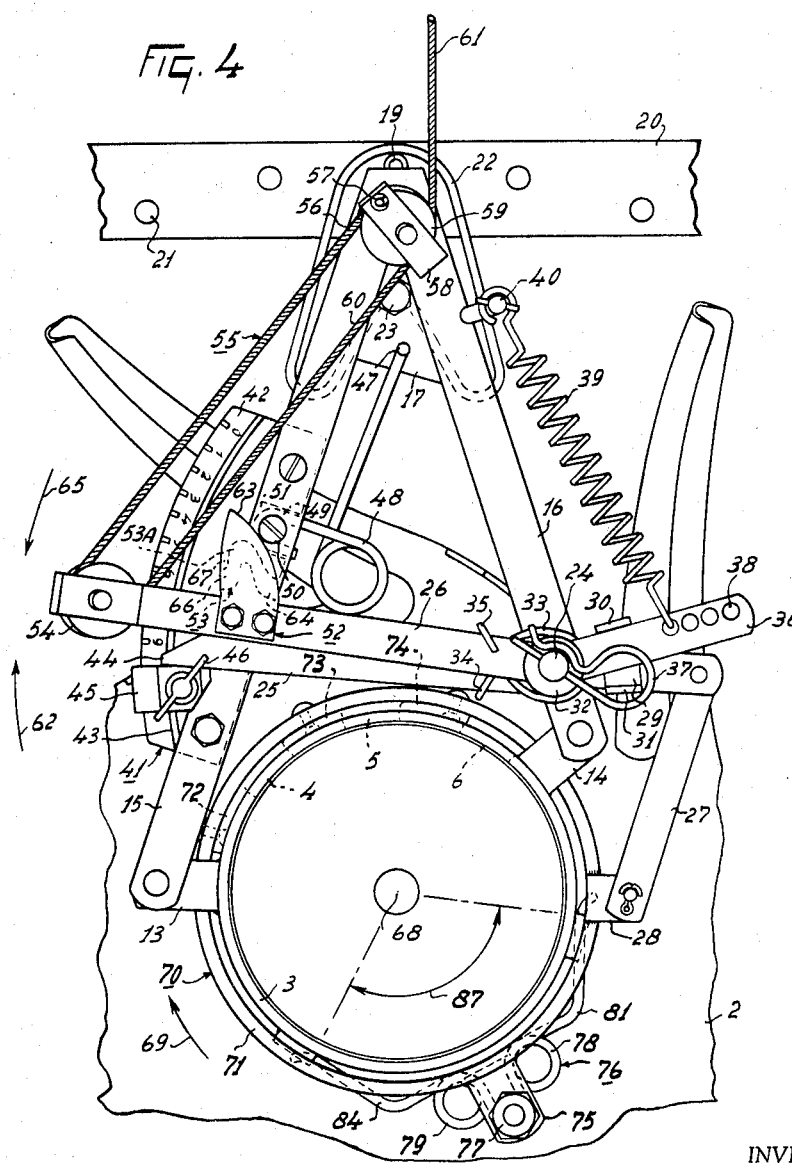

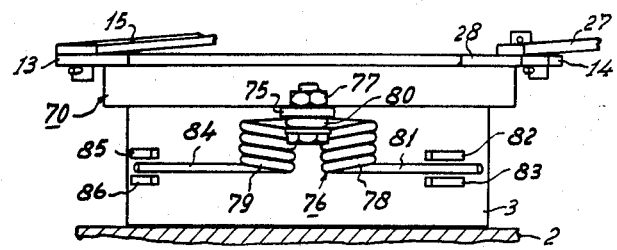
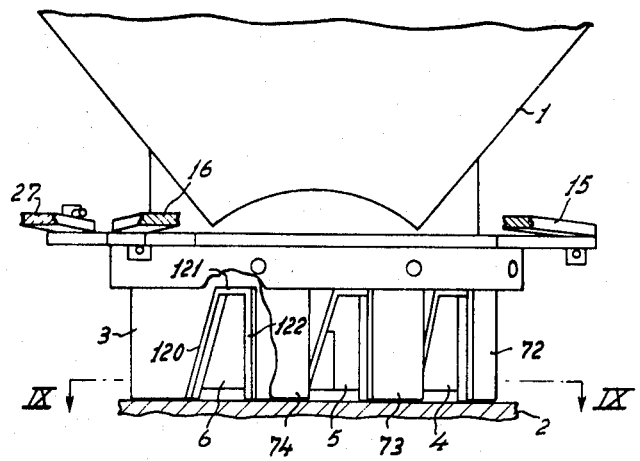
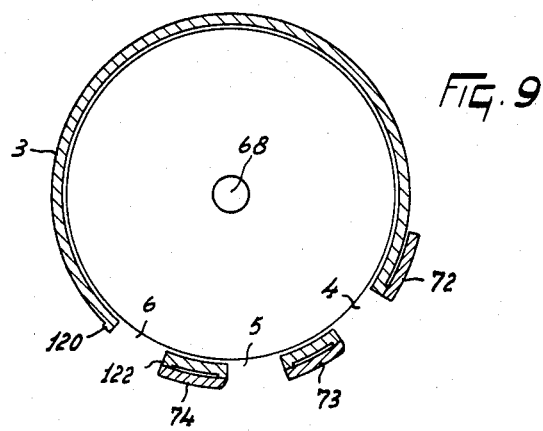

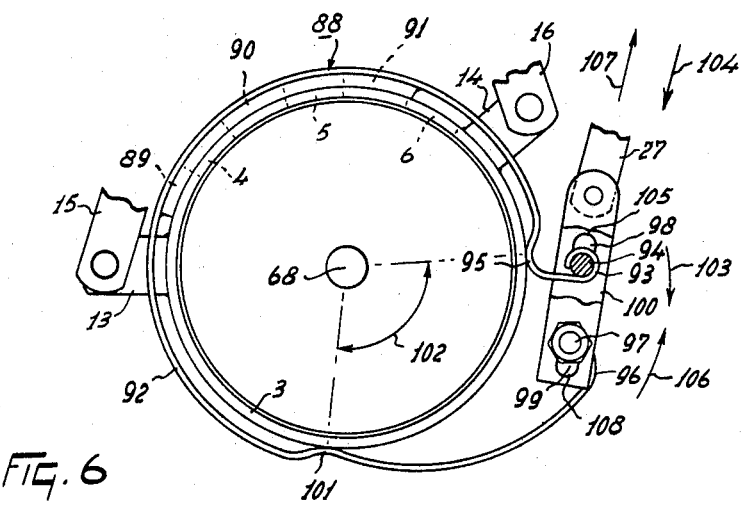

United States Patent Office 3,257,115
Patented June 21, 1966

3,257,115
IMPLEMENTS FOR SPREADING GRANULAR OR POWDERED MATERIAL
Ary van der Lely, Maasland, Netherlands, assignor to C. van der Lely N.V., South-Holland, Netherlands, a Dutch limited-liability company
Filed Aug. 26, 1963, Ser. No. 304,540
Claims priority, application Netherlands, Sept. 5, 1962, 282,919; Nov. 5, 1962, 285,565
19 Claims. (Cl. 275—15)

This invention relates to implements for spreading granular or powdered materials, such implements being of the kind comprising a frame, a hopper for material to be spread, at least one outlet port through which material from the hopper can reach a spreading member and a masking member arranged to enable the outlet port or ports to be closed, or to be opened to a desired extent.

An object of the invention is the provision of means whereby the outlet port or ports can be readily opened or closed during use of an implement of this kind.

According to the invention there is provided an implement of the kind set forth wherein the masking member is connected to the control arm of a control mechanism therefor, said arm being movably mounted on a part of the implement not directly connected to the masking member, and wherein spring means is arranged to act upon the control arm in such a way as to tend to retain said arm and the masking member in relatively fixed positions, the arrangement being such that a displacement of said control arm causes a corresponding displacement of the masking member.

Figure 3:
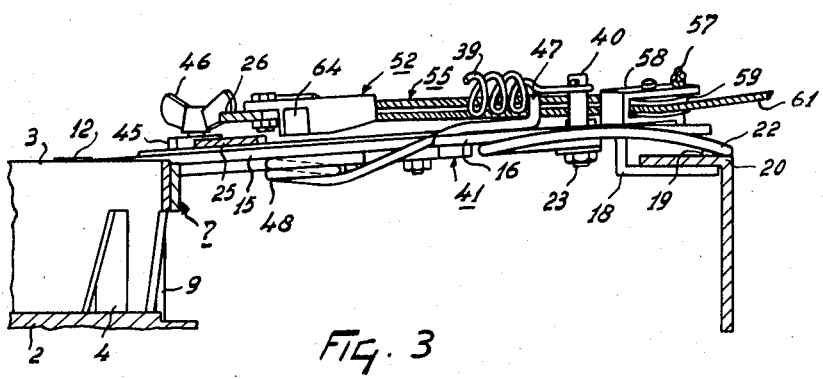
Figure 1:
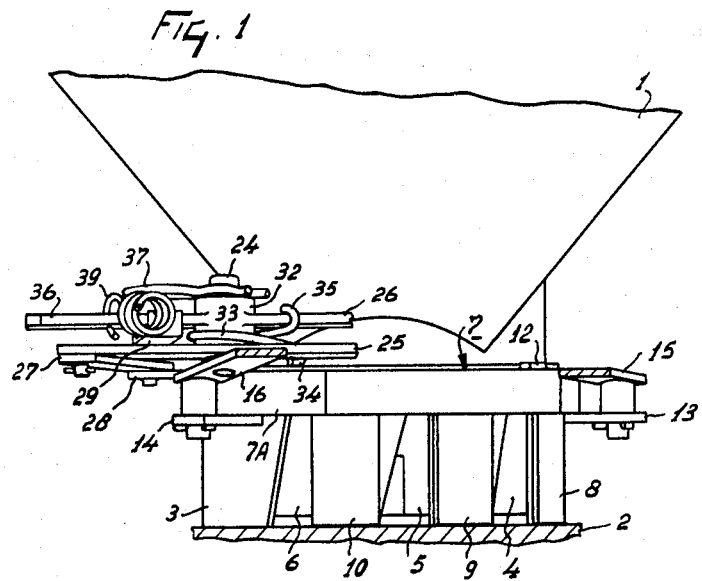

For a better understanding of the invention, and to show how the same may be carried into effect, reference will now be made, by way of example, to the accompanying drawings, in which:

FIG. 1 is a sectional elevation of part of an implement in accordance with the invention, the section being taken on the line I—I of FIG. 2, FIG. 2 is a plan view corresponding generally to FIG. 1 but showing further parts of the implement, FIG. 3 is a section taken on the line III—III of FIG. 2, FIG. 4 is a plan view corresponding to FIG. 2 but shows an alternative embodiment of certain parts of the implement, FIG. 5 is an elevation as seen in the direction indicated by the arrow V of FIG. 4, FIGS. 6 and 7 are plan views showing further alternative embodiments of certain of the parts which can be seen in FIGS. 2 and 4, FIG. 8 is a view similar to FIG. 1 but shows an alternative embodiment of certain parts, and FIG. 9 is a section taken on the line IX—IX of FIG. 8.

FIG. 1 of the drawings shows the lower end of a container in the form of a downwardly tapering hopper 1, a rotary distributor 2 being arranged thereunder. The lowermost end of the hopper 1 is of cylindrical configuration and is arranged concentrically within an outlet member in the form of an annulus 3 having three outlet ports, 4, 5 and 6. A masking member, generally indicated by the reference numeral 7, takes the form of a ring 7A arranged concentrically around the upper end of the annulus 3 and carrying three masking plates or shutters 8, 9 and 10 adapted to co-operate with the outlet ports 4, 5 and 6 respectively. Two spacing blocks 11 (FIG. 2) project from the convex wall of the annulus 3 at a location very approximately 180° removed around the center of the annulus from the outlet ports 4 to 6, the said blocks lying between the annulus 3 and the ring 7A. A stop 12 also projects from the annulus 3 in such a position that it lies, in the relative settings of the various parts illustrated in the drawings, immediately above the masking plate or shutter 8 of the masking member 7.

Two lugs 13 and 14 project from the wall of the annulus 3 and a setting member is pivotally connected to these lugs. The setting member includes two arms 15 and 16 rigidly secured to one another in V-shaped relationship, a plate 17 (FIG. 2) being arranged to reinforce the rigid connection between them. The free ends of the two arms 15 and 16 are connected to the two lugs 13 and 14 respectively with the aid of pins. A bracket 18 (FIG. 3) projects downwardly from the intersection of the arms 15 and 16, a horizontal limb of the said bracket carrying an upwardlly projecting pin 19 adapted to be entered in any one of an arcuately curved row of holes 21 formed in a horizontally extending frame member 20. The center of curvature of the row of holes 21 coincides with the common axis 68 of rotation of the distributor 2 and longitudinal axis of the annulus 3 and ring 7A.

A spring 22 in the form of a bent spring steel rod is secured to the plate 17 with the aid of a bolt 23 in such a way that it lies above the frame member 20. A substantially vertical shaft 24 is fastened to the arm 16 adjacent the lug 14 and a lever 25, and also a control arm 26, are turnably mounted on this shaft. One end of the lever 25 is pivotally connected by a link 27 to a lug 28 projecting from the ring 7A. Thus the lever 25, the link 27 and the lug 28 are joined to form a connecting member to the masking member 7. The lever 25 is arranged beneath the control arm 26 and carries a strip 29 on its uppermost side, the opposite ends of this strip being bent over upwardly to form two stops 30 and 31 that lie in the path of the control arm 26 and limit the angular extent by which the parts 25 and 26 can turn relative to one another about the shaft 24.

The control arm 26 is pivotally mounted on the shaft 24 by way of hub 32 which acts to space the said arm vertically above the letter 25. A spring 33 is wound around the hub 32 and has one end 34 hooked around the lever 25 and its other end 35 hooked around the control arm 26. The spring 33 is formed in such a way that it tends to urge one end 36 of the control arm 26 into engagement with the stop 30. As can be seen in FIGS. 1 and 2, axial displacement of the parts 25 and 26 along the shaft 24 is prevented by entering one leg of a resilient retaining pin 37 through a small transverse bore formed at the upper end of the shaft 24. The end 36 of the control arm 26 is formed with a row of holes 38 and one end of a resilient means comprising a helical tension spring 39 is hooked into a chosen one of these holes. The opposite end of the spring 39 is anchored to a vertical pin 40 projecting upwardlly from the arm 16 alongside the plate 17.

An arcuate seetting plate 41 is rigidly secured to the arm 15 in a central region thereof and carries a scale 42 marked with the numbers 0 to 10. The center of curvature of the plate 41 coincides with the longitudinal axis of the shaft 24 and the upper side of the said plate carries a ridge 43 arranged alongside the scale 42. The bent over tip 44 of the lever 25 is adapted to slide along the ridge 43 and to co-operate with an adjustable limiting means comprising a stop 45 which is arranged so that it can be slid along the scale 42 to any chosen setting and then releasably fixed in that setting with the aid of a clamp operated by a wing nut 46.

An upwardly projecting tooth 47 (FIGS. 2 and 3) is resiliently connected to the arm 15 by way of a coil spring 48 and a 180° bend 49. A screw or bolt 50 is entered between the limbs of the bend 49 and through a hole in the arm 15 to retain the said bend in position. As can be seen in FIG. 2 in broken lines, the bend 49 is housed in a recess 51 of the setting plate 41 so that the parts 47 and 48 cannot turn about the screw or bolt 50.

A catch 52 is bolted to the control arm 26 and is formed on its lower side with a very approximately V-shaped groove 53 adapted to co-operate with the tooth 47. A pulley 54 is rotatably mounted at the end of the control arm 26 remote from the end 36 and actuation means comprising a flexible cable 55 is passed therearound. A further pulley 59 is rotatably mounted in a holder 58 secured to the arms 15 and 16 adjacent the intersection thereof, the holder 58 including an anchor pin 57 to which one end 56 of the cable 55 is fastened. A portion 60 of the cable 55 is passed around the pulley 59 and a further portion 61 thereof leads to a location at which it can be pulled by an operator of the spreading implement to move the control arm 26 about the shaft 24.

The outlet ports 4, 5 and 6 of the spreading implement are shown in FIGS. 1 to 3 of the drawings as being fully open so that, in the use of the spreading implement in this condition, a maximum volume of material from the hopper 1 will be able to reach the rotary distributor 2 per unit time. As can be seen in FIG. 2, the lever 25 is in engagement with the stop 45 which latter is clamped alongside the mark "10" on the scale 42, this mark, as will be readily apparent, coinciding with the condition just mentioned to maximum opening of the outlet ports 4 to 6. The lever 25 is maintained in engagement with the stop 45 by the action of the spring 39 which tends always to turn the said lever about the shaft 24 in the direction indicated by the arrow 65 in FIG. 2. However, it should be noted that the lever 25 cannot turn about the shaft 24 beyond the angular position dictated by the stop 30.

When it is desired to spread material from the hopper 1 at a somewhat slower rate, the stop 45 may be moved along the scale 42 to an appropriate mark and be fixed in register with this mark with the aid of the wing nut 46. If, for example, the stop 45 were to be fixed in register with the mark "5" on the scale 42, the angular setting of the lever 25 about the shaft 24 would be correspondingly changed and this change would be transmitted to the ring 7A by way of the link 27 and lug 28. The outlet ports 4 to 6 would, in fact, be approximately half closed by the masking plates or shutters 8 to 10 respectively so that very approximately half the quantity of material per unit time would reach the rotary distribution 2 from the hopper 1 than when the outlet ports were fully open.

It is to be recognized that, during the use of the implement, occasions will frequently arise when a complete closure of the outlet ports 4 to 6 is temporarily required. At such a time, the operator of the implement who will normally be driving a tractor or other propelling and operating vehicle, pulls upon the portion 61 of the cable 55 so that the control arm 26 is turned about the shaft 24 in the direction indicated by the arrow 62 in FIG. 2. This turning movement brings a curved side 63 of the catch 52 into engagement with the tooth 47. Further pulling on the portion 61 of the cable 55 causes the tooth 47 to slide along the side 63 with a consequent tensioning of the spring 48 until it comes into register with the mouth 64 of the groove 53. The tensioned spring 48 causes the tooth 47 to snap into the mouth 64 whereafter the operator of the implement ceases to pull upon the cable 55. The spring 39 then tends to move the control arm 26 in the direction 65 but can only do so until the tooth 47 reaches the apex 53A of the groove 53.

At such time, the lever 25 has been turned in the direction 62 to a point at which its tip 44 is in register with the mark "0" on the scale 42 so that the outlet ports 4, 5 and 6 are completely closed by the masking plates or shutters 8, 9 and 10. It will be appreciated that, during the engagement of the tooth 47 with the groove 53, the control arm 26 is turned in the direction 62 beyond the position in which the tip 44 of the lever 25 is in register with the mark "0" on the scale 42 so that there would be a tendency for the said lever to be moved off the end of the scale 42. In fact, this cannot occur since, when the tip 44 registers with the mark "0," the masking plate or shutter 10 of the masking member 7 comes into engagement with the side of the lug 14 which acts as a second stop or limiting means positively to prevent further turning movement of the lever 25 about the shaft 24 in the direction 62. Nevertheless, further turning movement of the control arm 26 in this direction can occur by deformation of the spring 33 which normally acts to maintain the parts 25 and 26 in the relative positions which can best be seen in FIG. 2. Excessive turning movement of the control arm 26 in the direction 62 relative to the lever 25 is prevented by the stop 31 but the arrangement is such that the end 36 of the control arm 26 has not quite reached this stop when the tooth 47 comes into register with the mouth 64 of the groove 53. It will be appreciated that the tooth 47 and catch 52 together constitute a retaining mechanism adapted to fix the control arm 26 and interconnected lever 25 in a position which is such that the ports 4 to 6 of the delivery member constituted by the annulus 3 are completely closed by the masking plates or shutters 8 to 10 of the masking member 7.

When it is desired to re-open the outlet ports 4 to 6 of the annulus 3, the operator of the spreading implement pulls once again on the portion 61 of the cable 55 so that the control arm 26 is turned a short distance in the direction 62 and the tooth 47 moves along a portion 66 of the groove 53. Eventually, the tooth 47 will snap out of the portion 66 and lie against, or very close to, a side 67 of the catch 52 which is opposite to the side 63. The operator of the implement then releases the cable 55 to allow the spring 39 to turn the lever 25 and control arm 26 back about the shaft 24 in the direction 65 until the tip 44 of the lever 25 meets the previously positioned stop 45. The outlet ports 4 to 6 will thus be opened to exactly the same extent as they were before they were closed with the aid of the control mechanism afforded by the parts 25, 26, 39 and 55.

The position at which material spread by the rotary distributor 2 falls to the ground relative to the frame of the spreading implement is dependent principally upon the angular settings of the outlet ports 4 to 6 about the axis of rotation 68 of the rotary distributor 2. The said angular settings can be changed to adjust the eventual position of the material relative to the path of travel of the implement by withdrawing the pin 19 from the hole 21 in which it is lodged and turning the arms 15 and 16, together with the parts mounted thereon, about the axis 68 until the pin 19 can be entered in an appropriate new hole 21. The spring 22 tends to maintain the horizontal limb of the bracket 18 in engagement with the horizontal limb of the frame member 20 in which the holes 21 are formed but the said spring can readily be deformed to allow the pin 19 to be withdrawn from any particular hole 21 merely by pressing downwardly upon the arms 15 and 16 adjacent their point of intersection.

It will be apparent that an alteration of the angular setting of the annulus 3 about the axis 68 does not change the setting of the masking member 7 relative thereto since the whole of the control mechanism for the masking member 7 is carried by the arms 15 and 16 which are themselves turned about the axis 68 at such times. The spring 39 is only indirectly connected to the ring 7A by way of the control arm 26 so that it cannot exert any tendency to tilt the said ring relative to the annulus 3. The stop 12 prevents the ring 7A from being moved vertically relative to the annulus 3 but, as will be evident from FIG. 2, it is possible to move the parts 3 and 7A to relative positions in which the masking member 7 can be lifted off the annulus 3 when the hopper 1 has been raised clear of these parts. As can be seen in FIG. 2, the ring 7A is constituted by a first part to which the masking plates or shutters 8 to 10 are secured, this part abutting against the annulus 3 while a second part is rigidly secured to the opposite ends of the first part and extends around the annulus 3 in relatively spaced relationship. The second part bears against the aforementioned spacing blocks 11.

Upon turning the masking member 7 about the axis 68 in the direction indicated by the arrow 69 in FIG. 2 of the drawings while leaving the annulus 3 unmoved, the stop 12 carried by the latter will eventually move out of register with the first part of the ring 7A and into register with the second part thereof. As can be seen in FIG. 2, the second part of the ring 7A is spaced from the annulus by a distance which is very slightly in excess of the radial extent of the stop 12 so that the said ring can then be raised clear of the annulus 3 without meeting the stop 12. The arrangement which has just been described does not prevent the ring 7A from being raised relative to the annulus 3 at times when the outlet ports 4 to 6 are fully closed. However, if desired, a further stop, similar to the stop 12, can be provided on the annulus 3 above the outlet port 6 to prevent vertical movement of the ring 7A under the conditions which have just been mentioned.

FIGS. 4 and 5 of the drawings illustrate an alternative embodiment of the masking member which surrounds the outlet member or annulus 3. Many of the parts illustrated in FIGS. 4 and 5 are identical, or very similar, to those already described with reference to FIGS. 1 to 3 and the same reference numerals as previously employed are used to denote these parts. The masking member in this embodiment is generally indicated by the reference numeral 70 and comprises a ring 71 arranged concentrically around the annulus 3 and carrying three masking plates or shutters 72, 73 and 74. The lowermost edge of each masking plate or shutter bears directly against the uppermost surface of the rotary distributor 2. A lug 75 projects from the ring 71 diametrically opposite the middle masking plate or shutter 73 and a resilient member, generally indicated by the reference numeral 76, is fastened to the said lug with the aid of a bolt 77. The resilient member 76 comprises two vertically disposed coil springs 78 and 79 that are wound in relatively opposite directions, the uppermost ends of these two springs being integrally connected with one another by way of a 180° bend 80. As can be seen in the drawings, the bend 80 is clamped to the lower side of the lug 75 with the aid of the bolt 77.

The lowermost end of the spring 78 merges into a projection 81 whose free end is bent around so as to bear against the convex side of the wall of the annulus 3. As can be seen in FIG. 5, the said end is located between upper and lower guide lugs 82 and 83 rigidly secured to the annulus 3. The lowermost end of the spring 79 merges with a projection 84 whose free end is disposed between guide lugs 85 and 86. As is evident from the drawings, the parts 84 to 86 are symmetrically identical with the parts 81 to 83. The points at which the two ends of the projections 81 and 84 bear against the wall of the annulus 3 are relatively spaced about the axis 68 by an angle 87 (FIG. 4) of approximately 110°.

In the embodiment of the spreading implement which is illustrated in FIGS. 4 and 5, the lugs 13 and 14 are secured to the annulus 3 at a level above that of the ring 71 but the said ring is arranged to be angularly adjusted about the axis 68 to mask the outlet ports 4 to 6 to a chosen extent in the same way as has already been described with reference to FIGS. 1 to 4. The ends of the projections 81 and 84 of the springs 78 and 79 bear against the annulus 3 in such a way that the masking plates or shutters 72 to 74 are drawn into engagement with the wall of the annulus 3. The resilient member 76 is, in fact, so arranged that the resultant of the forces exerted on the annulus 3 by the springs 78 and 79 when the outlet ports 4 to 6 are fully closed passes through the center of the middle outlet port 5. It will be apparent that, when the said outlet ports are fully closed, the material in the hopper 1 also exerts forces on the three masking plates or shutters 72 to 74, the resultant of the forces also acting centrally of the middle outlet port 5 but in a relatively opposite direction to the resultant of the forces exerted by the resilient member 76. The resilient member 76 is constructed in such a way that the resultant of the forces exerted thereby slightly exceeds the resultant of the forces exerted on the masking plates or shutters 72 to 74 by the material in the hopper 1 so that the outlet ports 4 to 6 remain satisfactorily closed. With this arrangement, the masking member 70 can surround the annulus 3 with a certain amount of clearance without much risk of it becoming tilted relative to said annulus. Tilting of this kind interferes with relative angular adjustments of the parts 3 and 70.

Although, in the embodiment which has just been described with reference to FIGS. 4 and 5, the annulus 3 is itself arranged so as to be turnable about a cylindrical delivery portion of the hopper 1, substantially the same construction of the parts 70 and 76 may be employed when no movable annulus 3 is provided, that is to say, when outlet ports corresponding to the ports 4 to 6 are formed in a downward cylindrical extension of the hopper 1 itself, this extension being rigid with the remainder of the hopper 1. The parts 70 and 76 may also be employed in spreading implements having control mechanisms of a different construction to the previously described parts 25, 26, 39 and 55.

FIG. 6 shows a resilient masking member that is generally indicated by the reference numeral 88, this member comprising a bent strip 92 of resilient material, such as spring steel, spaced from the annulus 3 by a distance of a few millimeters and carrying three masking plates or shutters 89, 90 and 91 whose uppermost ends are interconnected. One end of the strip 92 is formed as a loop 93, said loop being engaged around a pin 94 in such a way that the pin can turn in the loop. At a location adjacent the loop 93, the strip 92 is bent to form an abutment 95 which bears against the wall of the annulus 3. The opposite end of the strip 92 is bent to form a further loop 96 which loop is similarly engaged around a pin 97 in such a way that the pin can turn in the loop. A second abutment 101 is formed in the strip 92 at a location spaced from the loop 96, the said abutment 101 also bearing against the wall of the annulus 3.

As can be seen in FIG. 6, the abutments 95 and 101 are spaced apart from one another about the axis 68 by an angle 102 having a magnitude of about 100°. The pins 94 and 97 have their upper and lower ends entered through elongated slots 98 and 99 formed in upper and lower strips 100, part of the upper strip 100 being broken away in FIG. 6 of the drawings. The lops 93 and 96 are wound around the pins 94 and 97 between the strips 100 and the previously described link 27 is pivotally connected to the ends of the strips 100 in such a way that its own end is sandwiched between them.

At times when the previously described control mechanism afforded by the parts 25, 26, 39 and 55 is at rest, the various parts that have been just described will occupy approximately the positions illustrated in FIG. 6, that is to say, the two pins 94 and 97 will be disposed at the relatively closest ends of the two pairs of slots 98 and 99. The strip 92 of the masking member 88 is formed in such a way that its abutments 98 and 101 tend to press against the wall of the annulus 3 thus pulling the masking plates or shutters 89 to 91 into engagement with the approximately diametrically opposed portion of the same wall which contains the outlet ports 4 to 6. This ensures that the outlet ports will be maintained closed when required to an extent such that there will be no leakage, or very little leakage, therethrough. When the masking member 88 is to be angularly adjusted relative to the annulus 3 in, for example, the direction indicated by the arrow 103 in FIG. 6, the link 27 is moved axially in the direction indicated by the arrow 104. The pin 97 will be forced to follow this movement fully but the pin 94 will tend to remain unmoved and to slide towards the ends of the slots 98 denoted by the reference numeral 105 in FIG. 6. The engagement of the strip 92 around the annulus 3 will thus be loosened so that the said strip will readily be able to move in the desired direction 103. When the angular adjustment has been completed, the spring strip 92 will regain its normal configuration as illustrated in FIG. 6. It will be evident from the description that has just been given that, when it is desired to adjust the masking member 88 angularly in the relatively opposite direction denoted by the arrow 106 in the drawing, the link 27 will move axially in the direction indicated by the arrow 107 so that the pin 97 will tend to remain unmoved and to slide towards the ends of the slots 99 denoted by the reference numeral 108. It will be apparent that the slots ends 105 and 108 afford stops which prevent the ring-shaped strip 92 from being widened excessively while the opposite ends of the same slots afford stops which prevent the strip from being closed excessively. The spacing between the adjacent ends of the slots 98 and 99 thus determines the clamping pressure which the masking member 88 can exert upon the annulus 3.

FIG. 7 shows a further alternative form of masking member which is generally denoted by the reference numeral 110. This member is afforded by a resilient ring-shaped strip 114 formed from, for example, spring steel. The opposite ends 115 and 116 of the strip 114 are riveted or otherwise rigidly secured to an arcuate connecting plate carrying three masking plates or shutters 111, 112 and 113 adapted to co-operate with the three outlet ports 4, 5 and 6 respectively. A lug 117 is riveted or otherwise rigidly secured to the strip 114 and the end of the link 27 is pivotally connected to this lug. Two embossed abutments 118 and 119 are formed in the strip 114 diametrically opposite to the masking plates or shutters 111 to 113 and the strip 114 is formed in such a way that the engagement of these abutments with the annulus 3 draws the masking plates or shutters 111, 112 and 113 resiliently into engagement with the portion of the annulus 3 in which the outlet ports 4 to 6 are formed. This arrangement allows the said outlet ports to be satisfactorily closed when necessary and maintains the masking member 110 in its correct disposition relative to the annulus 3. The resilient clamping action of the strip 114 around the annulus 3 is not sufficient to interfere with the angular adjustment of the masking member 110 about the axis 68 with the aid of the link 27.

FIGS. 8 and 9 show an embodiment of the spreading implement in which a masking member is employed having a construction similar, or identical, to that of the masking member 70 illustrated in FIGS. 4 and 5. As can be seen in the drawings, each of the outlet ports 4, 5 and 6 has four sides, three of these sides being provided with an outwardly projecting rim 120, 121 and 122 respectively. Only the lowermost side of each port which is afforded by the uppermost surface of the rotary distributor 2 is not provided with a rim. The provision of the projecting rims 120 to 122 around each of the three outlet ports 4 to 6 tends to make the three masking plates or shutters 72, 73 and 74 contact the said rims with a much greater pressure per unit area than would otherwise be the case so that the tendency for leakage of material through the outlet ports 4 to 6 is reduced without any need for excessive strength of the springs 78 and 79 of the resilient members 76.

The use of the rims 120 to 122 adds the further advantage that they act as scraper blades and scrape away any material adhering to the concave sides of the masking plates or shutters 72 to 74 during angular adjustment of the latter relative to the annulus 3. If there is any danger that angular adjustments of the kind just mentioned would be carried out to an extent such that the masking plates or shutters 72 to 74 would come into register with portions of the wall of the annulus 3 not provided with rims, then auxiliary rims may be formed on the said wall at locations spaced from the outlet ports 4 and 6 to prevent this danger. It will be apparent that, if the parts 72 to 74 were to come into register with portions of the annulus 3 not possessing the said rims, then the resilient member 76 would draw them radially inwardly so that subsequent angular adjustments would be blocked by the rims which were, in fact, provided.

What I claim is:

1. In an implement for spreading granular or powdered material, an annulus receiving said material, said annulus having an outlet port, a masking member selectively covering said port, a lever interconnected to said masking member, movement of said lever relative to said annulus moving said masking member over said port, a control arm resiliently connected with said lever whereby movement of said control arm urges a corresponding movement by said lever, a first stop means adjustable with respect to said annulus limiting the movement of said lever in one direction and a second stop means limiting the movement of said lever in a direction opposite to the aforesaid direction whereby said lever is movable only within the limits of said stops, resilient means associated with said control arm orienting said control arm whereby said lever is urged against said first stop means, actuation means associated with said control arm for orienting said control arm whereby said lever is urged against said second stop means, and catch means releasably engageable by said control arm in an orientation whereby said lever is urged against said second stop means.

2. An implement for spreading granular or powdered material comprising a hopper, a spreader disposed proximate the lower end of said hopper, at least one outlet port near the bottom of said hopper whereby material in said hopper is fed to the portion of said rotatable spreader outside said hopper through said port, a masking member covering said port, a connecting member for positioning said masking member relative to said port, a pair of limiting means for limiting the movement of said connecting member, a control arm resiliently connected to said connecting member whereby movement of said control arm urges a corresponding movement by said connecting member, a spring biasing said control arm in a first position, movement of said connecting member being restricted by one of said limiting means and said port being opened at least in part in said first position, actuation means for selectively moving said arm counter to the direction it is urged by said spring to a second position, said connecting member being restricted by the other of said limiting means whereby said port is closed in said second position, and a catch means releasably engageable by said control arm for maintaining said connecting member in said second position.

3. An implement in accordance with claim 2 including pivot means wherein said control arm and said connecting member are both mounted on said pivot means.

4. An implement in accordance with claim 2, wherein said connecting member includes a lever.

5. An implement in accordance with claim 2 wherein the first mentioned one of said limiting means is adjustably mounted relative to said hopper, whereby the size of the opening of said port as uncovered by said masking member is controlled.

6. An implement in accordance with claim 2 wherein said catch means includes a catch and a tooth arranged to cooperate therewith, at least part of said catch means being mounted on said control arm.

7. An implement in accordance with claim 2 which includes a pivot means and interlocking means, said connecting member including a lever, said control arm and said lever both mounted on said pivot means and turnable about the same pivotal axis, and said interlocking means engaging said control arm and said lever to limit the relative angular movement between said lever and said control arm about said pivot.

8. An implement in accordance with claim 7 including a further spring, said further spring interconnecting said lever and said control arm urging same in a predetermined angular relationship.

9. An agricultural implement for spreading granular or powdered material comprising a frame, a hopper carried by said frame, the lower portion of said hopper including an annulus member, a rotatable spreader disposed under said annulus member, with the central portion of said spreader forming the bottom of said annulus member, at least one outlet port in the side of said annulus member whereby material in said hopper is fed to the portion of said rotatable spreader outside of said annulus member through said port, a masking member for covering said port, a setting member, a connecting member for positioning said masking member relative to said port carried by said setting member, limiting means for limiting the movement of said connecting member also carried by said setting member, said setting member connected to said annulus member, a control arm resiliently connected to said connecting member, movement of said control arm urging a corresponding movement by said connecting member, resilient means biasing said control arm whereby movement of said connecting member is urged to a position wherein it is restricted by said limiting means with said masking member uncovering said port at least in part, actuation means for selectively moving said control arm together with said connecting member counter to the direction it is urged by said resilient means with said masking member thereby covering said port, a catch member carried by said setting member releasably engageable by said control arm for maintaining said port in said covered position, and securing means cooperating with said setting member and said frame whereby said setting member together with said annulus member and said port is selectively adjustable relative to said frame about the axis of rotation of said spreader.

10. An implement for spreading granular or powdered material, comprising a hopper, a rotatable spreader disposed under said hopper, an annulus member included in the lower portion of said hopper, a part of said spreader forming the bottom of said annulus member, at least one outlet port near the bottom of said annulus member whereby material in said hopper is fed to the portion of said rotatable spreader outside of said annulus member through said port, a masking member embracing said annulus member, said masking member including shutter means selectively covering said port and bearing against the edges thereof, a resilient member associated with said masking member urging said shutter means against the edges of said port whereby the introduction of said material in said space between said annulus member and said masking member is restrained, a connecting member positioning said masking member relative to said port, a pair of limiting means for limiting the movement of said connecting member, a control arm resiliently connected to said connecting member whereby movement of said control arm urges a corresponding movement by said connecting member, a spring biasing said control arm whereby said control arm urges said connecting member against one of said limiting means and said port is opened at least in part, and actuation means for selectively moving said control arm counter to direction it is urged by said spring whereby said control arm urges said connecting member against the other of said limiting means with said port being thereby closed.

11. An agricultural implement comprising a hopper, an annulus member included in the lower portion of said hopper, a rotatable spreader disposed under said annulus member, at least one outlet in the side of said annulus member whereby material in said hopper is fed to the portion of said spreader outside said annulus member through said port, a masking member for covering said port, shutter means included in said masking member, a rim projecting normally from the edges of said port, said shutter means bearing against said rim, resilient means urging said shutter means against said rim whereby the introduction of material between said shutter means and said ring member is restrained, a connecting member for positioning said masking member relative to said port, a pair of limiting means for limiting the movement of said connecting member, a control arm resiliently connected to said connecting member whereby movement of said control arm urges a corresponding movement by said connecting member, a spring biasing said arm whereby said control arm urges said connecting member to a first position where its further movement is restricted by one of said limiting means and said port is opened at least in part, actuation means for selectively moving said control arm counter to the direction it is urged by said spring whereby said connecting member is urged to a second position restricted from further movement by the other of said limiting means said port being thereby closed, and a catch means releasably engageable by said control arm for maintaining said connecting member in a position whereby it is restricted by the other limiting means with said port closed.

12. An implement for spreading granular or powdered material comprising a frame, a hopper carried by said frame, the lower portion of said hopper including an annulus member, rotatable spreader disposed under said annulus member, at least one outlet port in the side of said annulus member whereby material in said hopper is fed to said rotatable spreader through said port, a masking member for covering said port, a setting member, a connecting member for positioning said masking member relative to said port carried by said setting member, said setting member movably connected to said annulus member, a control arm resiliently connected to said connecting member, and securing means cooperating with said setting member and said frame whereby said setting member together with said annulus member and said port is selectively adjustable relative to said frame about the axis of rotation of said spreader, said securing means including a pin mounted to said setting member and a series of holes provided in a frame part concentrically arranged around the axis of rotation of the spreader, a resilient member being incorporated in said securing means and biasing said pin selectively in one of said holes whereby said setting member is movable counter to the direction it is urged by said resilient member to adjust said setting member with the annulus member relative to said frame.

13. An implement for spreading granular and powdered material comprising a hopper, an annulus member included in the lower portion of said hopper, a rotatable spreader disposed under said annulus member, at least one outlet port in the side of said annulus member whereby material in said hopper is fed to the portion of said spreader outside said annulus through said port, a masking member movably embracing said annulus member, said masking member including shutter means selectively covering said port and bearing against the edges thereof, and a resilient member associated with said masking member urging said shutter means against the edges of said port, whereby the introduction of said material into space between said annulus member and said masking member restrained, said masking member being composed of resilient material, and including a connecting member for rotating said masking member about said annulus member, said masking member rotatably embracing said annulus and having two movable ends at least one of which is coupled to said connecting member whereby, when said connecting member moves said masking member about said annulus member said ends are displaced relative to one another.

14. An implement in accordance with claim 13 wherein said connecting member includes a strip member, a pair of slots in said strip member, each of the opposite ends of said masking member movably retained in one of said slots and resiliently urged towards the ends of said slots closest to each other, whereby when said strip is moved one of said ends moves with said strip and the other of said ends remains stationary relative to said strip with the distance between said ends thereby being increased.

15. An implement for spreading granular and powdered material comprising a hopper, an annulus member included in the lower portion of said hopper, a rotatable spreader disposed under said annulus member, at least one outlet port in the side of said annulus member whereby material in said hopper is fed to the portion of said spreader outside said annulus through said port, a masking member movably embracing said annulus member, said masking member including shutter means selectively covering said port and bearing against the edges thereof, and a resilient member associated with said masking member urging said shutter means against the edges of said port, whereby the introduction of said material into space between said annulus member and said masking member is restrained, said masking member comprising a resilient portion surrounding said annulus member, said resilient member comprising resilient indentations in said portion resiliently bearing against said annulus member, and shutter means secured to said resilient portion urged thereby against said annulus member.

16. An implement for spreading granular or powdery material comprising a hopper, an annulus-shaped member mounted at the lower end of said hopper, a rotatable spreader disposed under said annulus-shaped member, at least one outlet port provided in said annulus-shaped member, whereby material in said hopper is fed to said spreader through said port, an inherently resiliently, substantially ring-shaped member embracing said annulus-shaped member, inwardly projecting abutment means on said ring-shaped member for clamping same to said annulus-shaped member, masking means connected to said ring-shaped member, a control lever connected to said ring-shaped member to rotatably adjust the ring-shaped member around said annulus-shaped member, controlling means to rotatably adjust and retain said masking means in one of a plurality of different positions relative to said annulus-shaped member so as to close or open said port.

17. An implement as claimed in claim 16, wherein said annulus-shaped member is connected to a setting arm whereby said annulus-shaped member can be turned relative to said ring-shaped member.

18. An implement as claimed in claim 16, wherein said ring-shaped member has two ends which are movable relative to each other.

19. An implement as claimed in claim 18, wherein a connecting member is mounted between the said two ends of the ring-shaped member, said connecting member being slidably connected to at least one end of said ring-shaped member and said control lever being pivotably connected to said connecting member.

References Cited by the Examiner

UNITED STATES PATENTS

| | | | |
|---|---|---|---|
| 386,699 | 7/1888 | Freeman | 275—15 |
| 390,292 | 10/1888 | Gore | 275—15 |
| 676,925 | 6/1901 | Stevens et al. | 275—15 |
| 1,166,476 | 1/1916 | Parrish | 275—15 |
| 2,535,414 | 12/1950 | Heidger | 275—15 X |
| 3,100,645 | 8/1963 | Mascaro | 275—15 X |

ABRAHAM G. STONE, *Primary Examiner.*

WILLIAM A. SMITH III, *Assistant Examiner.*